United States Patent [19]

Fuehrer et al.

[11] Patent Number: 5,463,915

[45] Date of Patent: Nov. 7, 1995

[54] DRIVE-REVERSING GEARING FOR AN ENGINE DRIVEN TRANSMISSION

[75] Inventors: Reece R. Fuehrer, Danville; Roy K. Martin, Plainfield, both of Ind.

[73] Assignee: General Motors Corporation, Detroit, Mich.

[21] Appl. No.: 140,656

[22] Filed: Oct. 21, 1993

[51] Int. Cl.⁶ .............................. B60K 5/04; B60K 17/08; B60K 17/28; F16H 1/12
[52] U.S. Cl. .................... 74/665 H; 74/15.84; 74/420; 180/297
[58] Field of Search ................ 74/665 H, 15.84, 74/420; 180/292, 297

[56] References Cited

U.S. PATENT DOCUMENTS

| | | | |
|---|---|---|---|
| 3,006,199 | 10/1961 | Christenson et al. | 74/15.84 |
| 3,309,943 | 3/1967 | Kosman et al. | 180/292 X |
| 4,216,684 | 8/1980 | Hagin et al. | 475/72 |
| 4,723,616 | 2/1988 | van der Lely | 74/15.84 X |

FOREIGN PATENT DOCUMENTS

| | | | |
|---|---|---|---|
| 3925409 | 2/1991 | Germany | 180/297 |
| 4234664 | 4/1993 | Germany | 74/665 H |
| 669150 | 3/1952 | United Kingdom | 180/292 |

*Primary Examiner*—Charles A. Marmor
*Assistant Examiner*—Nathan O. Jensen
*Attorney, Agent, or Firm*—Donald F. Scherer

[57] ABSTRACT

An engine direction reversing gear arrangement has a drive gear on the engine centerline and a driven gear, meshing with the drive gear, on the an idler shaft. The transmission input is an angle gear such that a V-drive is provided between the engine and the vehicle output drive members. The direction reversing is accomplished with two gear meshes, the gear pair on the engine and transmission centerline and the angle input drive to the transmission.

2 Claims, 3 Drawing Sheets

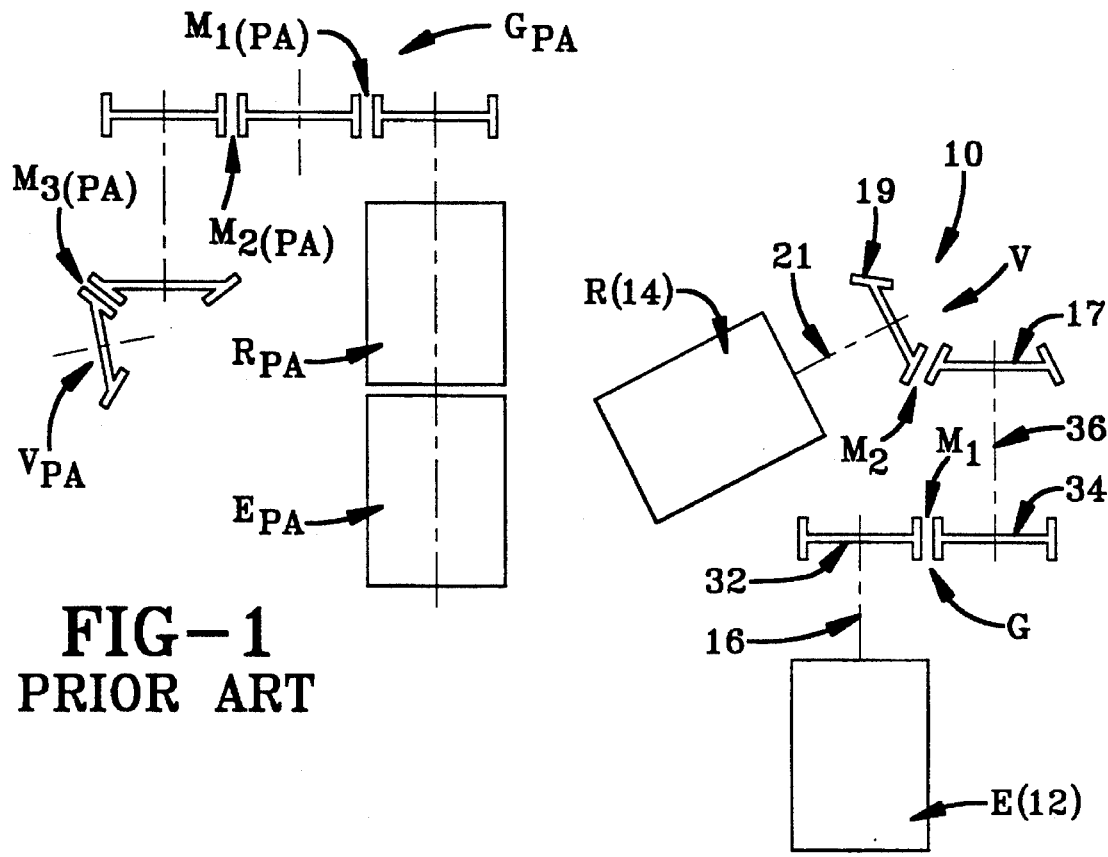
FIG-1 PRIOR ART
FIG-2
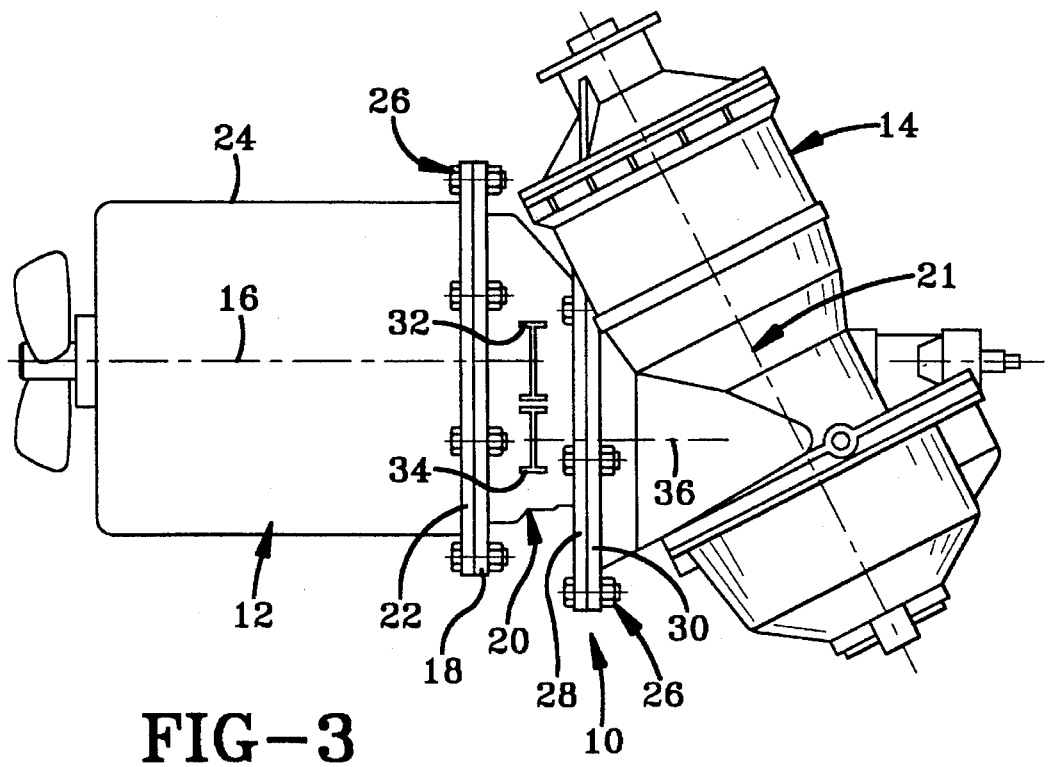
FIG-3

DRIVE-REVERSING GEARING FOR AN ENGINE DRIVEN TRANSMISSION

TECHNICAL FIELD

The present invention relates generally to vehicular drivetrains, or powertrains. More particularly, the present invention relates to improved engine/transmission drivetrain, or powertrain, arrangements. Specifically, the present invention relates to improved drivetrain arrangements for reversing the rotational hand of the engine output prior to delivery to the vehicle output.

BACKGROUND OF THE INVENTION

Two types of engine output drive arrangements are possible—viz.: engines providing right-hand rotation to the output shaft and engines providing left-hand rotation to the output shaft. The right-hand engine is more prevalent. However, many of the angle drive, or V-drive, arrangements in the United States of America are left-hand drive systems such as those built by the Allison Division of General Motors corporation. These drive systems are found mostly in buses with diesel engines. V-drives are, however, becoming more popular in Europe, and the European market prefers right-hand drive engines and right-hand transmissions such as the ZF-Ecomat or those built by Voith.

Currently available transmissions must provide a plurality of forward drive ratios and one or more reverse ratios to take full advantage of the engine speed range. The majority of such transmissions are adapted for left-hand drive engines, and as such, are not readily usable with right-hand drive engines without some means, such as a gearing assembly, to effect rotational direction reversing. Some right-hand drive transmissions have been thus modified to provide left-hand output from right-hand engines. However, these transmissions have traditionally had the V-drive gearing at the transmission output and the drive reversing gears are added between the transmission output and the V-drive gearing input. While these systems are satisfactory, they do require high torque capacity gears in the rotational reversing portion of the drive train in order to permit the transfer of the transmission output torque to the vehicle drive mechanism. Also, these systems require at least three gear meshes to accomplish rotational direction reversal.

The V-drive arrangements are generally employed with an engine that is oriented transversely of the vehicle. The input portion—i.e.: torque converter and the drive ratio gearing—of a right-hand transmission is located on the engine centerline. So disposed, the transverse dimension of the vehicle required to accommodate a right-hand drive arrangement is greater than that required by a left-hand drive arrangement. Even the added gear meshes at the transmission output increase the dimensional requirement.

SUMMARY OF THE INVENTION

It is, therefore, a primary object of the present invention to provide a novel and improved engine/transmission drive arrangement wherein the rotational hand of the engine output is reversed prior to delivery to the transmission input for all forward drive ratios of the transmission.

It is another object of the present invention to provide an improved engine reversing gear arrangement for a powertrain, as above, wherein the engine output shaft and the transmission input shaft can be located on different centers, limited only by the selected gear set employed to effect rotational reversal.

It is a further object of the present invention to provide an improved engine reversing gear arrangement for a powertrain, as above, wherein the reversing gears are mounted on the engine output centerline and the transmission input centerline such that the reversing is accomplished with only two gear meshes.

It is still another object of the present invention to provide an improved engine reversing gear arrangement for a powertrain, as above, which enhances the space utilization of the engine compartment in a vehicle.

It is yet another object of the present invention to provide a powertrain, as above, utilizing an engine having one directional sense and a transmission with an opposite directional sense in combination with a reversing gearing to provide compliance between the engine and the vehicle drive mechanism and thereby also provide a powertrain having a minimal overall length.

It is an even further object of the present invention to provide an improved engine reversing gear arrangement for a powertrain, as above, which enhances the location of the power takeoff mechanism not only for the operational efficiency of the accessories driven thereby but also their maintenance and reliability.

These and other objects of the invention, as well as the advantages thereof over existing and prior art forms, which will be apparent in view of the following detailed specification, are accomplished by means hereinafter described and claimed.

In general, the present invention provides a rotational reversing arrangement for a left-hand V-drive transmission to permit the transmission to be coupled with a right-hand engine. The drive reversing gears are disposed between the engine output and the transmission input such that only two gear meshes are required. Thus, the present invention uses one less gear member than prior art rotational reversal arrangements. Because the gears are located at the engine output, the maximum torque that will be transmitted is engine output torque. This is considerably less than required of prior art arrangements which must transmit engine torque multiplied by the maximum transmission ratio. The transmission ratio is generally in the range of 4.0 to 8.0 depending upon the stall ratio of the torque converter, if one is used. The reduced torque capacity requirement of the present invention allows narrower tooth widths, which saves material and weight in the transmission.

By placing the rotational reverse gearing on the input side of the transmission, it is possible to minimize the transverse space requirement of the powertrain. When compared with the conventional direction reversing systems presently available, the present invention requires between 3.5 inches (8.89 cm.) and 4.4 inches (11.18 cm.) less space. This permits the present invention to be used in the narrower buses that are produced for use on the narrower roadways of some countries.

The present invention also permits the installation of power takeoff gearing at the engine output without affecting the overall length of the powertrain. It is desirable to have the power takeoff at the engine output because of the higher speed available to drive accessories To acquaint persons skilled in the arts most closely related to the present invention, one preferred embodiment of a rotational reversing gearing arrangement that illustrates a best mode now contemplated for putting the invention into practice is described herein by, and with reference to, the annexed drawings that form a part of the specification. The exemplary rotational reversing assembly is described in detail without attempting to show all of the various forms and modification in which the invention might be embodied. As such, the embodiment shown and described herein is illustrative, and as will become apparent to those skilled in these arts can be modified in numerous ways within the spirit and scope of the invention; the invention being measured by the appended claims and not by the details of the specification.

BRIEF DESCRIPTION OF THE DRAWINGS

FIG. 1 is a schematic gear arrangement of a prior art powertrain;

FIG. 2 is schematic gear arrangement of a powertrain incorporating the present invention;

FIG. 3 is diagrammatic representation of a powertrain incorporating the present invention;

DESCRIPTION OF AN EXEMPLARY EMBODIMENT

Figure 4:
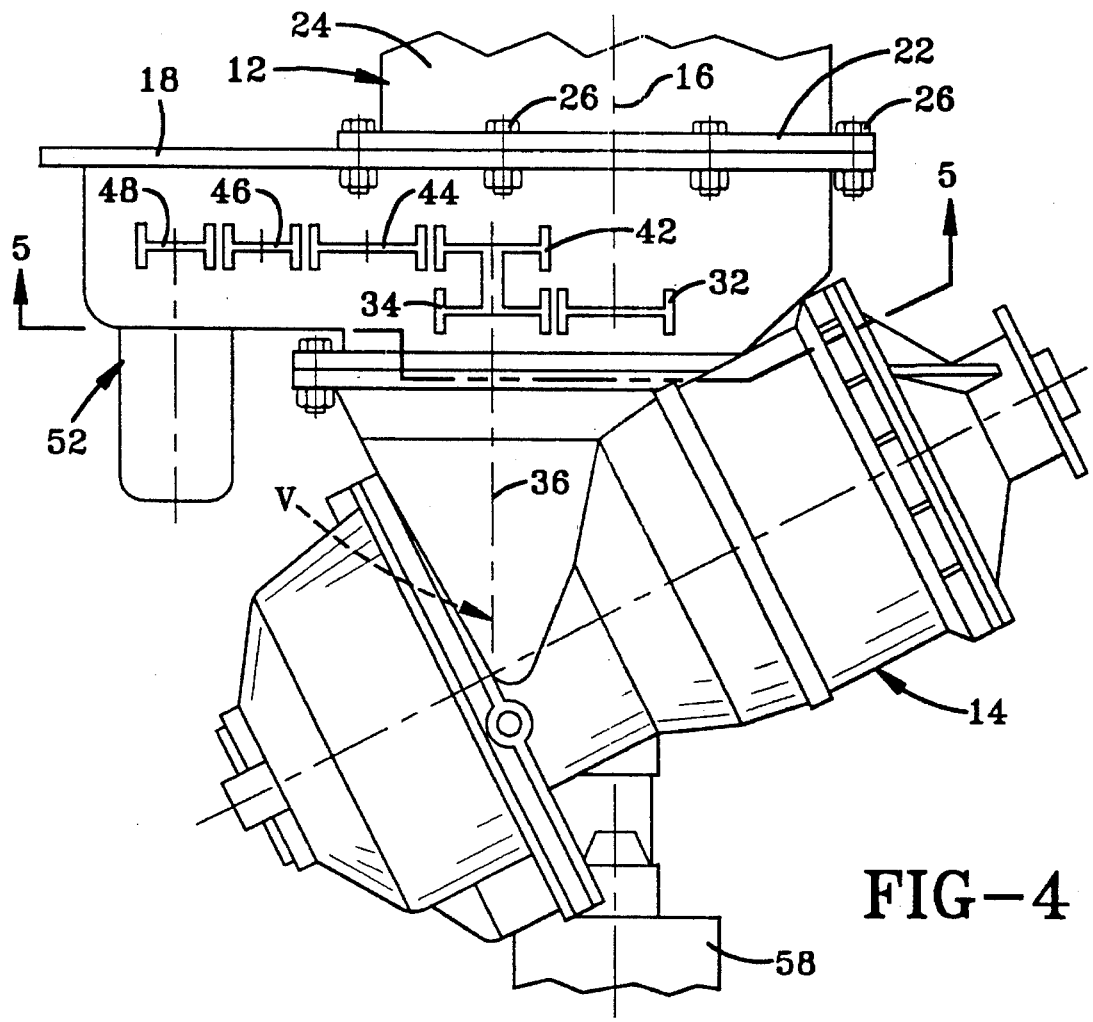
FIG. 4 is diagrammatic representation of a powertrain and power takeoff incorporating the present invention.

One representative form of powertrain embodying the concepts of the present invention is designated generally by the numeral 10 on FIGS. 2 through 6. FIG. 1, on the other hand, depicts a representative prior art powertrain. The prior art powertrain includes a right-hand rotating engine $E_{PA}$ connected directly to a transmission range pack $R_{PA}$. A reversing gear set $G_{PA}$ is interposed between the transmission range pack $R_{PA}$ and an angle gear set $V_{PA}$. The reversing gear set $G_{PA}$ and the angle gear set $V_{PA}$ require three gear meshes $M_{1(PA)}$, $M_{2(PA)}$ and $M_{3(PA)}$ in order to accomplish the rotational reversal necessary for the right-hand rotating engine $E_{PA}$ to apply the left-hand rotation to the drive the vehicle.

The present invention, as schematically represented in FIG. 2, also has a right-hand rotating engine E, a transmission range pack R, a reversing gear set G and an angle gear set V. However, the reversing gear set G and the angle gear set V utilize only two gear meshes $M_1$ and $M_2$. In contrast to the prior art powertrain—wherein the range pack $R_{PA}$ is disposed between the engine $E_{PA}$ and the gear set $G_{PA}$—a powertrain embodying the concepts of the present invention allows the range pack R to be connected to the output of the angle gear set V. As such, the reversing gear set G may be desirably disposed between the engine E and the angle gear set V.

To assist in the comparison of the schematic representation of FIG. 2 to the diagrammatic representation of FIG. 3, the reversing gear set is represented by the first gear member 32, mounted on the engine output shaft 16, that meshingly engages (as at $M_1$) a first transfer, or idler, gear 34, mounted on what is sometimes called an idler shaft 36 (and which is also sometimes called an input shaft to the transmission). The angle gear set is represented by another transfer, or idler, gear 17, which is also mounted on the idler shaft 36, that meshingly engages (as at $M_2$) the input gear 19, mounted on what is commonly referred to as the input shaft 21 of the transmission 14.

In the prior art arrangement, the reversing gear set $G_{PA}$ must transmit the power downstream of the range pack $R_{PA}$. In this location, the engine torque is increased not only by the gear ratios of the range pack but also by any torque converter multiplication that is included in the powertrain. Accordingly, The gears in the prior art gear sets $G_{PA}$ must be larger in width than the gears required in the gear set G in order to accommodate the high torque transfers. This torque capacity requirement, and the added gear mesh, mandate a higher cost of manufacture for the prior art arrangement as compared to the arrangement permitted by the present invention. If the angle gear set $V_{PA}$, or V, is not considered—inasmuch as the V-drive is necessary for either powertrain application—the present invention provides rotational reversing with mesh $M_1$ of only two gears while the prior art requires the meshes $M_{1(PA)}$ and $M_{2(PA)}$ of three gears.

With more particular reference to the diagrammatic representation in FIGS. 3 and 4, the improved powertrain 10 includes an engine 12 and a transmission 14. The engine 12 may be a conventional diesel engine providing right-hand rotation of the output shaft 16. As is well known, a diesel engine can provide right-hand or left-hand rotation of the output shaft 16 with equal facility. The transmission coupled to these engines, however, must be designed to accommodate the specific hand at which the engine output shaft is rotated. The majority of the left-hand engines are used with V-drive transmissions in powertrains for buses. The left-hand V-drive transmission has an angle drive between the output shaft of the engine and the torque converter of the transmission. These angle drive input devices are well known. One such transmission is shown in U.S. Pat. No. 2,889,718 which has both a torque converter and a friction clutch disposed in the input drive path of the transmission.

A first mounting flange 18 on an adapter 20—which is in the nature of a coupler housing—is secured to the anchor flange 22 presented from the engine block 24, as by fastening means 26 in the nature of bolts. A spaced, second mounting flange 28 on the adapter 20 is secured to a connecting flange 30 on the transmission 14, also by fastening means 26. The adapter 20 houses a pair of meshing gears 32 and 34 which are secured to the engine output shaft 16 and an idler shaft 36, respectively. The meshing gears 32 and 34 are effective to reverse the rotation of the idler shaft 36 relative to the rotation of the engine output shaft 16. Thus, a normally left-hand transmission 14 may be conveniently coupled to a fight-hand engine 12. Most importantly, this reversal of engine rotation is accomplished with only two meshing gears.

It should also be appreciated that the left-hand transmission has the gear 19 forming the V-drive disposed in the power path prior to the drive ratio gearing in the transmission 14. This is in contrast to right-hand transmissions which have the V-drive sequential downstream from the drive ratio gearing in the transmission. This distinction is quite important inasmuch as it: affects the overall axial dimension of the powertrain 10; limits the location of any power take-off to the output side of the drive ratio gearing; and, limits the speed range of the power take-off in direction-reversed fight-hand transmissions.

Figure 5:
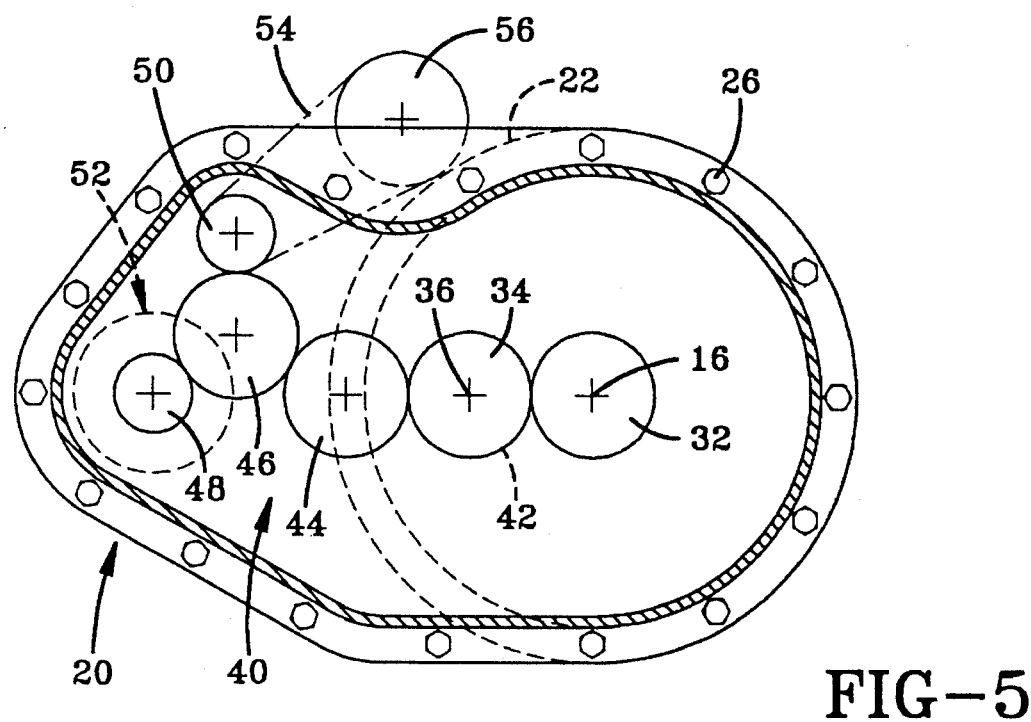
FIG. 5 is a diagrammatic view taken substantially along line 5—5 of FIG. 4; and, FIG. 6 is a diagrammatic representation of a powertrain incorporating the present invention installed in a multi-passenger vehicle.

As best seen in FIG. 4, the direction reversing gears 32 and 34 within the adapter 20 will accommodate a gear cluster 40 that constitutes the power take-off arrangement. The power take-off arrangement is comprised of an input gear 42, first and second idler gears 44 and 46 as well as first and second driven gears 48 and 50. The driven gears may be directly connected to an accessory, such as an alternator 52, or they may be connected through a belt drive 54 to an air conditioner compressor input pulley 56 (FIG. 5).

With conventional right-hand transmissions which one might desire to use with a right-hand engine, the reversing gearing is disposed between the range gearing output and the V-drive. To install a power take-off at this location, would require that the accessories be sized to accommodate the lowest speed ratio of the transmission. Thus, the accessories would be larger or multi-speed accessory drives are needed. In either event, the use of a right-hand engine with a left-hand transmission provides a much more economic package than the use of a right-hand transmission with a right-hand engine.

Figure 6:
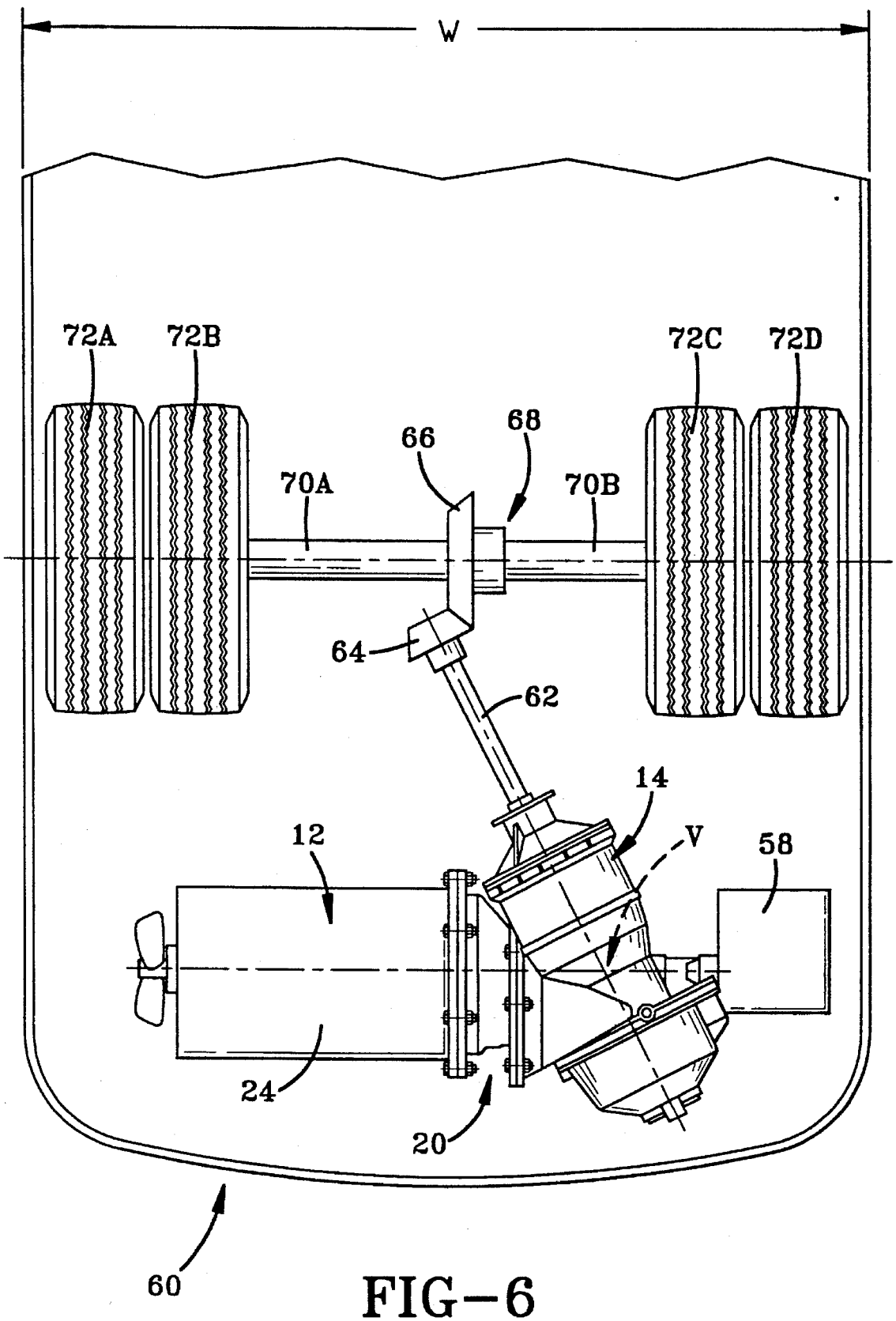

The combination of a left-hand transmission 14 and right-hand engine 12, as shown in FIG. 6, can be installed in significantly less axial dimension than the combination of a right-hand engine and right-hand transmission. The combination of engine 12, transmission 14 and accessory packages 52, 56 and 58 can be installed in bus 60 having a typical width W of ninety six (96) inches (2.44 m). The envelope dimensions of currently available packages including right-hand transmissions used in conjunction with right-hand engines are too large for such packages to be installed in these busses. This limits the use of such packages to larger busses which can not operate on some of the narrow roadways in Europe. The transmission 14 connects to a driveshaft 62 which is connected to a pinion gear 64 that meshes with a ting gear 66 inside a conventional 63° differential 68. The axle output shafts 70A and 70B are drivingly connected with drive wheels 72A, 72B and 72C, 72D of the bus 60. As previously described herein, the drive wheels 72 and the oppositely extending, transmission output shafts 70A and 70B have a combined, transverse dimension defined as W which limits the minimum width of the bus 60.

The foregoing description of an exemplary embodiment of the invention has been presented for the purposes of illustration and description. It is not intended to be exhaustive or to limit the invention to the precise form disclosed. Obvious modifications or variations are possible in light of the above teachings. The embodiment chosen and described is intended to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled As should now be apparent, the present invention not only teaches that an engine reversing gear arrangement for a powertrain embodying the concepts of the present invention not only effects the rotational reversal prior to deliver of the rotational drive torque prior to the input of the transmission but is also capable of accomplishing the other objects of the invention.

We claim:

1. An improvement in angle drive power transmissions having a normal input rotational direction wherein the improvement comprises:

an adapter housing secured between an engine and a transmission;

said engine having an output shaft means;

said transmission having an input shaft means;

a first gear member disposed within said adapter and drivingly secured to said engine output shaft;

a cluster gear arrangement disposed within said adaptor;

said cluster gear arrangement having a first transfer gear meshing with the first gear member and a second transfer gear;

an input gear disposed within said adapter and being drivingly connected with said transmission input shaft whereby the rotational hand applied to the transmission input shaft is reversed from the rotational hand of the engine output shaft;

power take-off gear means disposed within said adapter;

said power take-off having a first and second idler gear means rotatably coupled with one of the transfer gears of the cluster gear; and, accessory gear means meshing with the idler gear means and being disposed to transmit power to accessory means.

2. An improved angle drive power transmission, as set forth in claim 1, wherein:

the accessory means is mounted on said adapter.

\* \* \* \* \*